(12) United States Patent
Yang

(10) Patent No.: US 10,603,893 B2
(45) Date of Patent: Mar. 31, 2020

(54) 3D PRINTING DEVICE AND PRINTING CORRECTION METHOD

(71) Applicants: XYZprinting, Inc., New Taipei (TW); Kinpo Electronics, Inc., New Taipei (TW)

(72) Inventor: Yu-Jie Yang, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 257 days.

(21) Appl. No.: 15/462,922

(22) Filed: Mar. 20, 2017

(65) Prior Publication Data

US 2018/0186095 A1 Jul. 5, 2018

(30) Foreign Application Priority Data

Jan. 5, 2017 (TW) .............................. 106100336 A

(51) Int. Cl.
| | |
|---|---|
| *B29C 67/00* | (2017.01) |
| *B33Y 50/02* | (2015.01) |
| *B33Y 30/00* | (2015.01) |
| *B33Y 50/00* | (2015.01) |
| *B29C 64/20* | (2017.01) |
| *B29C 64/386* | (2017.01) |

(52) U.S. Cl.
CPC ............ *B33Y 50/02* (2014.12); *B29C 64/20* (2017.08); *B29C 64/386* (2017.08); *B33Y 30/00* (2014.12); *B33Y 50/00* (2014.12)

(58) Field of Classification Search
CPC .................................................. B29C 67/0088
See application file for complete search history.

(56) References Cited

U.S. PATENT DOCUMENTS

| | | | |
|---|---|---|---|
| 2013/0242317 A1* | 9/2013 | Leavitt ................... | B41J 29/393 358/1.8 |
| 2017/0057171 A1* | 3/2017 | Chang ................. | B29C 67/0088 |

FOREIGN PATENT DOCUMENTS

WO 2015077195 5/2015

OTHER PUBLICATIONS

"Office Action of Taiwan Counterpart Application," dated Oct. 3, 2018, pp. 1-10.

\* cited by examiner

*Primary Examiner* — Joseph A Miller, Jr.
(74) *Attorney, Agent, or Firm* — JCIPRNET

(57) ABSTRACT

A 3D printing device and a printing correction method are provided. The 3D printing device includes a printing nozzle, a printing platform and a controller. The printing nozzle is controlled to move on the movement plane. The printing platform includes a first tilt sensor to sense a tilting state of the printing platform. The controller is coupled to the first tilt sensor. The printing correction method adapted to the 3D printing device includes following steps: sensing the tilting state of the printing platform; controlling the printing nozzle to be depressed in a first position on the printing platform to change the tilting state of the printing platform; and, correcting the relative position of the print platform with the movement plane by the first position and the changes of tilting state of the printing platform sensed by the tilt sensor.

12 Claims, 4 Drawing Sheets

3D PRINTING DEVICE AND PRINTING CORRECTION METHOD

CROSS-REFERENCE TO RELATED APPLICATION

This application claims the priority benefit of Taiwan application serial no. 106100336, filed on Jan. 5, 2017. The entirety of the above-mentioned patent application is hereby incorporated by reference herein and made a part of this specification.

BACKGROUND OF THE INVENTION

Field of the Invention

The present invention generally relates to a three-dimensional (3D) printing technology, in particular, to a method for correcting a print head and a printing platform and a 3D printing device thereof.

Description of Related Art

With the progress of Computer-Aided Manufacturing (CAM), the 3D printing technology is developed in the manufacturing industry, and an original concept of design can be manufactured rapidly by using a 3D printer. The 3D printing technology is in fact a general name for a series of Rapid Prototyping (RP) technologies, and a basic principle of all of them is additive manufacturing. An RP machine forms a sectional shape of an object in an XY plane in a scanning manner, and intermittently performs displacement by the thickness of layer along Z coordinates, so as to finally form a 3D object.

In a 3D printing process, a tilt status of a printing platform, configured to carry a 3D model, is an important variable affecting printing quality. A severer tilt status naturally causes lower printing quality. Therefore, each time before 3D printing is performed, it is necessary to first correct relative positions of a print head and a printing platform, so as to amend a tilt status. However, conventional technologies for correcting a print head position are complex and time-consuming, which causes that initialization of a 3D printer cannot be accelerated. Therefore, providing a simple, accurate, and efficient 3D printing device is still one of the targets for which those skilled in the art pay great efforts.

SUMMARY OF THE INVENTION

The present disclosure provides a method for correcting a print head and a printing platform and a 3D printing device, in which a tilting state of the printing platform can be measured and adjusted by using a tilt sensor on the printing platform, so as to reduce time consumed by a correction process.

A 3D printing device of an embodiment of the present disclosure includes a print head, a printing platform, and a controller. The print head is controlled by the controller to move on a movement plane. The printing platform includes a first tilt sensor. The first tilt sensor is configured to sense a tilting state of the printing platform. The controller is coupled to the first tilt sensor. The controller controls the print head to press down at a first position on the printing platform to change the tilting state of the printing platform and corrects a relative position relationship between the printing platform and the movement plane by using the first position and a change of the tilting state sensed by the first tilt sensor.

A method for correcting a print head and a printing platform of an embodiment of the present disclosure includes the following steps: sensing a tilting state of the printing platform by using a first tilt sensor; controlling the print head to press down at a first position on the printing platform to change the tilting state of the printing platform; and correcting a relative position relationship between the printing platform and a movement plane on which the print head is located according to the first position and the tilting state sensed by the first tilt sensor.

On the basis of the above, in the present disclosure, by means of disposing a first tilt sensor on a printing platform, a print head may be provided with no limit switch, which reduces the weight of the print head, so that a movement speed of the print head is increased. In addition, the 3D printing device of the present disclosure may also learn tilt degrees of a printing platform ad a moving mechanism by using tilt sensors disposed on the printing platform and the moving mechanism, which configured to move a print head, and perform correction according to the tilt degrees, thereby effectively reducing time consumed by correcting the 3D printing device.

In order to make the foregoing features and advantages of the present invention comprehensible, embodiments accompanied with drawings are described in detail below.

DESCRIPTION OF THE EMBODIMENTS

First, it needs to be noted that, the first axis, second axis, and third axis in the following exemplary embodiments respectively correspond to an X axis, a Y axis, and a Z axis in XYZ axis spaces shown in FIG. 1 and FIG. 3, but the present disclosure is not limited thereto. In the present disclosure, the first axis and the second axis are disposed not in parallel, but a degree of an included angle between the first axis and the second axis is not limited in the present disclosure.

In the present disclosure, the movement plane is constituted by the first axis and the second axis. That is, an XY plane in the XYZ axis space shown in FIG. 1 and FIG. 3 is used an example in the following exemplary embodiments, but the movement plane in the present disclosure is not limited thereto. In a proper range, the movement plane may be another plane with a normal vector different from that of the XY plane. The X axis, Y axis, and Z axis are merely used to represent different direction vectors, and the present disclosure is not limited to representation manners of the X axis, Y axis and Z axis.

The 3D printing device of the present disclosure prints a 3D model according to printing information provided by an operating device. Generally, the operating device, for example, is an electronic device having an operating capability such as a personal computer, a notebook computer, a smart phone, or a slate computer. Specifically, the operating device may construct a 3D model by using Computer-Aided Design (CAD) or animation modeling software, and slice the constructed 3D model into a plurality of cross-sectional layers, and then, provide printing information of the cross-sectional layers to the 3D printing device. The 3D printing device may construct and stack a plurality of slice objects in sequence according to printing information of the cross-sectional layers, so as to form a 3D model. Two different exemplary embodiments of the present disclosure are described below in detail.

First Exemplary Embodiment

Figure 1:
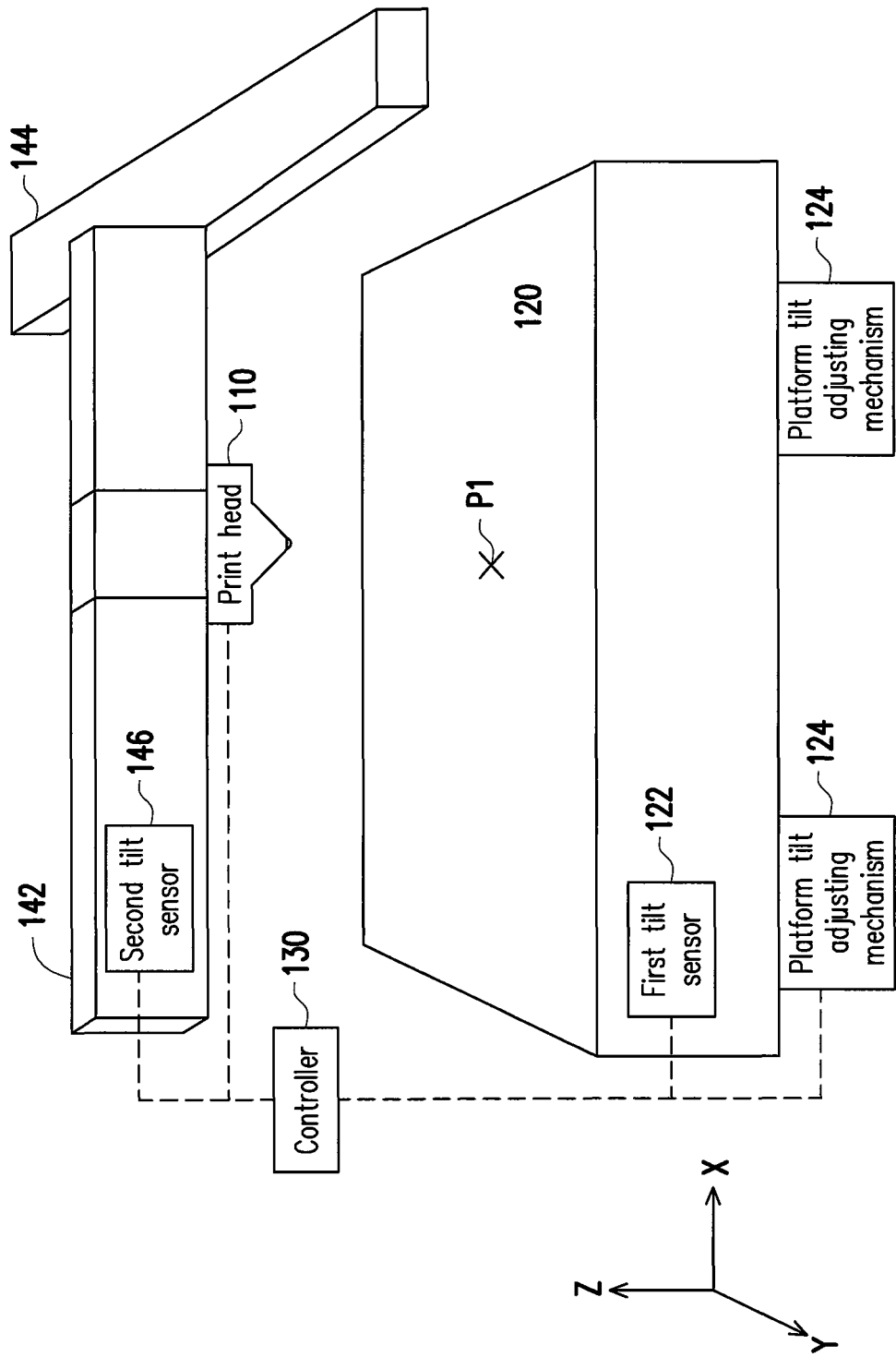
FIG. 1 shows a schematic diagram of a 3D printing device according to a first exemplary embodiment of the present invention.

FIG. 1 shows a schematic diagram of a 3D printing device according to a first exemplary embodiment of the present invention. Referring to FIG. 1, the 3D printing device of the this exemplary embodiment includes a print head 110, a printing platform 120, a controller 130, and a moving mechanism constituted by a moving element 142 and a fastening element 144.

The print head 110 is configured to spray a material needed for printing. Different types of print heads are disposed for forms of 3D printing devices. For example, the print head 110 may be a print head that is configured to heat, melt, and spray a laminated material or a print head that directly sprays the laminated material, and the present disclosure is not limited to a form of the print head 110.

The print head 110 is disposed on the moving mechanism. The moving mechanism includes the moving element 142 and the fastening element 144. The moving element 142 is disposed along a first axis, the fastening element 144 is disposed a long a second axis, and the moving element 142 is connected to the fastening element 144. The moving element 142 and fastening element 144 perform implementation by means of an electric slide rail, a movable motor, or the like, but the present disclosure is not limited thereto.

Specifically, the print head 110 is disposed on the moving element 142 of the moving mechanism, and the print head 110 is actuated by the moving element 142 to move along the first axis. Moreover, the moving element 142 is connected to the fastening element 144, and the moving element 142 is actuated by the fastening element 144 to move along the second axis, so as to indirectly enable the print head 110 to move along the second axis. In addition, a vertical element, for example, a movable long rod, is disposed between the moving element 142 and the print head 110. The print head 110 is actuated by the vertical element to move toward the third axis. Therefore, by means of actuation of the moving element 142, the fastening element 144, and the vertical element, the print head 110 can move along a first axial direction, a second axial direction, and a third axial direction in space and spray the laminated material, so as to print a 3D model.

The printing platform 120 is configured to carry the printed 3D model. The printing platform 120 is also provided with a platform tilt adjusting mechanism 124, configured to adjust the tilting state of the printing platform 120. The platform tilt adjusting mechanism 124 performs height adjustment and horizontal adjustment by means of a plurality of step motors, but the present disclosure is not limited thereto.

The controller 130 is configured to receive the printing information and control, according to the printing information, the print head 110 to perform 3D printing. The controller 130, for example, is a Central Processing Unit (CPU), a programmable microprocessor, a programmable controller, an Application Specific Integrated Circuit (ASIC), another similar device, or a combination of the devices.

In other embodiments of the present disclosure, the 3D printing device, for example, further includes a transmission receiving port and a storage unit. The transmission receiving port is configured to receive printing information or a control instruction transmitted from another operating device. The transmission receiving port, for example, conforms to the Serial Advanced Technology Attachment (SATA) standard, the Universal Serial Bus (USB) standard, the Parallel Advanced Technology Attachment (PATA) standard, or another suitable standard. The storage unit is configured to store printing information or an control instruction transmitted from another operating device and, for example, is a hard disk drive (HDD), a random access memory (RAM), a flash memory, or a combination of the foregoing various components.

In a general process of performing 3D printing, in order to perform accurate positioning, the movement plane where the print head 110 moves and the printing platform 120 are disposed in parallel to each other. Due to factors such as the environment, the gravity, the temperature, and the load, it would be easy for the movement plane where the print head 110 moves and the printing platform 120 to present a non-parallel state, so that an error occurs at a position where a material is sprayed. Therefore, printing correction before 3D printing is performed is an important part of 3D printing. Existing printing correction is calculating a relative position relationship between the movement plane on which the print head 110 is located and the printing platform 120 by disposing a limit switch on the print head 110 and by controlling the print head 110 to press down at a plurality of points on the printing platform 120 and adjusting a tilt of the printing platform 120 according to the relative position relationship.

However, disposition of the limit switch increases the weight of the print head 110, resulting in a low movement speed of the print head 110. In addition, because the relative position relationship is calculated by controlling the print head 110 to press down at the plurality of points on the printing platform 120, in order to obtain a needed value and increase accuracy of correction, in common correction, it is necessary to press down at a plurality of points to obtain a correction value, resulting in a tediously long correction process.

In order to reduce the time consumed by the correction process, the printing platform 120 of the present disclosure is provided with the first tilt sensor 122 to sense a tilting state of the printing platform 120. In addition, the tilting state of the printing platform 120 is corrected by using the tilting state of the printing platform 120 sensed by the first tilt sensor 122. In addition, in this exemplary embodiment, a second tilt sensor 146 is further disposed on the moving element 142, to measure a tilting degree of the movement plane. The controller 130 further controls, according to the tilting state of the printing platform 120 measured by the first tilt sensor 122 and a tilting state of the movement plane measured by the second tilt sensor 146, the platform tilt adjusting mechanism 124 to adjust the printing platform 120, so as to perform printing correction. The first tilt sensor 122 and the second tilt sensor 146 may be an accelerometer, a magnetic sensor, an electronic compass sensor, a gyroscope, a rotation vector sensor, a three-axis linear acceleration sensor, a light sensitive tilt sensor, and the like, and the present disclosure does not limit the types of the first tilt sensor 122 and the second tilt sensor 146.

An implementation method of correcting the 3D printing device by using the first tilt sensor 122 and the second tilt sensor 146 in this exemplary embodiment is described below in detail by referring to FIG. 1 and FIG. 2.

Figure 2:
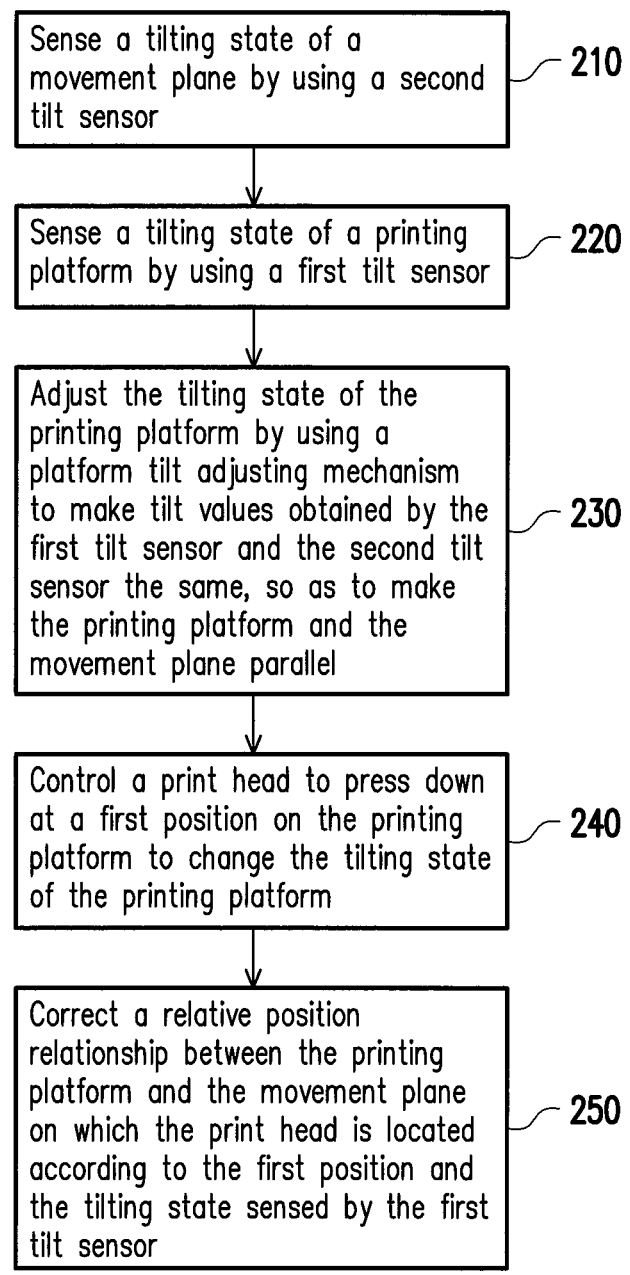
FIG. 2 shows a flowchart of a printing correction method according to the first exemplary embodiment of the present invention.

FIG. 2 shows a flowchart of a printing correction method according to the first exemplary embodiment of the present invention. Referring to FIG. 1 and FIG. 2 at the same time, in a process of performing printing correction in the exemplary embodiment of the present disclosure, steps 210 to 230 are performed first to correct relative positions of the movement plane (namely, the xy plane) and the printing platform 120. Subsequently, steps 240 to 250 are performed to correct relative positions of the print head and the printing platform 120 in the third axial direction (namely, the z axis).

In step 210, a controller 130 senses a tilting state of a movement plane by using a second tilt sensor 146. For example, a tilt angle of the movement plane is sensed by using the second tilt sensor 146.

In step 220, the controller 130 senses a tilting state of a printing platform 120 by using a first tilt sensor 122. For example, a tilt angle of the printing platform 120 is sensed by using the first tilt sensor 122. In addition, in step 230, the controller 130 adjusts the tilting state of the printing platform 120 by using a platform tilt adjusting mechanism 124 to make tilt values obtained by the first tilt sensor 122 and the second tilt sensor 146 the same, so as to make the printing platform 120 and the movement plane parallel.

Specifically, in order to make a printed 3D model more accurate, the printing platform 120 and the movement plane where the print head 110 moves are disposed in a relatively parallel manner. In this exemplary embodiment, because the first tilt sensor 122 and the second tilt sensor 146 are respectively disposed on the printing platform 120 and moving element 142, the controller 130 can perform comparison and calculate a value difference between tilt angles directly according to the tilt values measured by the first tilt sensor 122 and second tilt sensor 146 (for example, the tilt degrees measured by the first tilt sensor 122 and second tilt sensor 146). Subsequently, the controller 130 further adjusts the tilting degree of the printing platform 120 according to the value, so as to make the printing platform 120 and the movement plane parallel to each other.

In step 240, the controller 130 controls the print head 110 to press down at a first position P1 on the printing platform 120 to change the tilting state of the printing platform 120. In addition, in step 250, the controller 130 corrects a relative position relationship between the printing platform 120 and a movement plane on which the print head 110 is located according to the first position P1 and the tilting state measured by the first tilt sensor 122.

Specifically, when the print head 110 presses down and gets contact with the first position P1, because the first tilt sensor 122 detects that the tilting state of the printing platform 120 changes, the controller 130 determines that print head 110 presses down to the printing platform 120. At this time, the controller 130 obtains a displacement of the print head 110 in the third axial direction, and controls, according to the displacement in the third axial direction, the platform tilt adjusting mechanism 124 to adjust the height of the printing platform 120. For example, when the displacement of the print head 110 in the third axial direction is higher than a preset displacement in the third axial direction, the controller 130 controls the platform tilt adjusting mecha-nism 124 to adjust the height of the printing platform 120. Hence, the controller 130 corrects relative positions of the print head 110 and the printing platform 120 in the third axial direction.

By means of steps 210 to 250, the controller 130 first corrects the relative positions of the movement plane where the print head 110 moves and the printing platform 120, and subsequently, the controller 130 further corrects the relative positions of the print head 110 and the printing platform 120 in the third axial direction. Hence, the movement plane of the print head 110, the third axis direction, and positions of the printing platform 120 relative to three axial directions can be accurately corrected.

In this exemplary embodiment, by means of disposing the first tilt sensor 122 and the second tilt sensor 146, the print head 110 no longer needs to be provided with a limit switch, so that the weight of the print head 110 is reduced. In addition, the controller 130 only needs to control the print head 110 to press down at one point, so as to correct the third axis direction (for example, the Z axis). Therefore, by means of the implementation manner of this exemplary embodiment, the time consumed for correcting the 3D printing device can be effectively reduced.

Second Exemplary Embodiment

Figure 3:
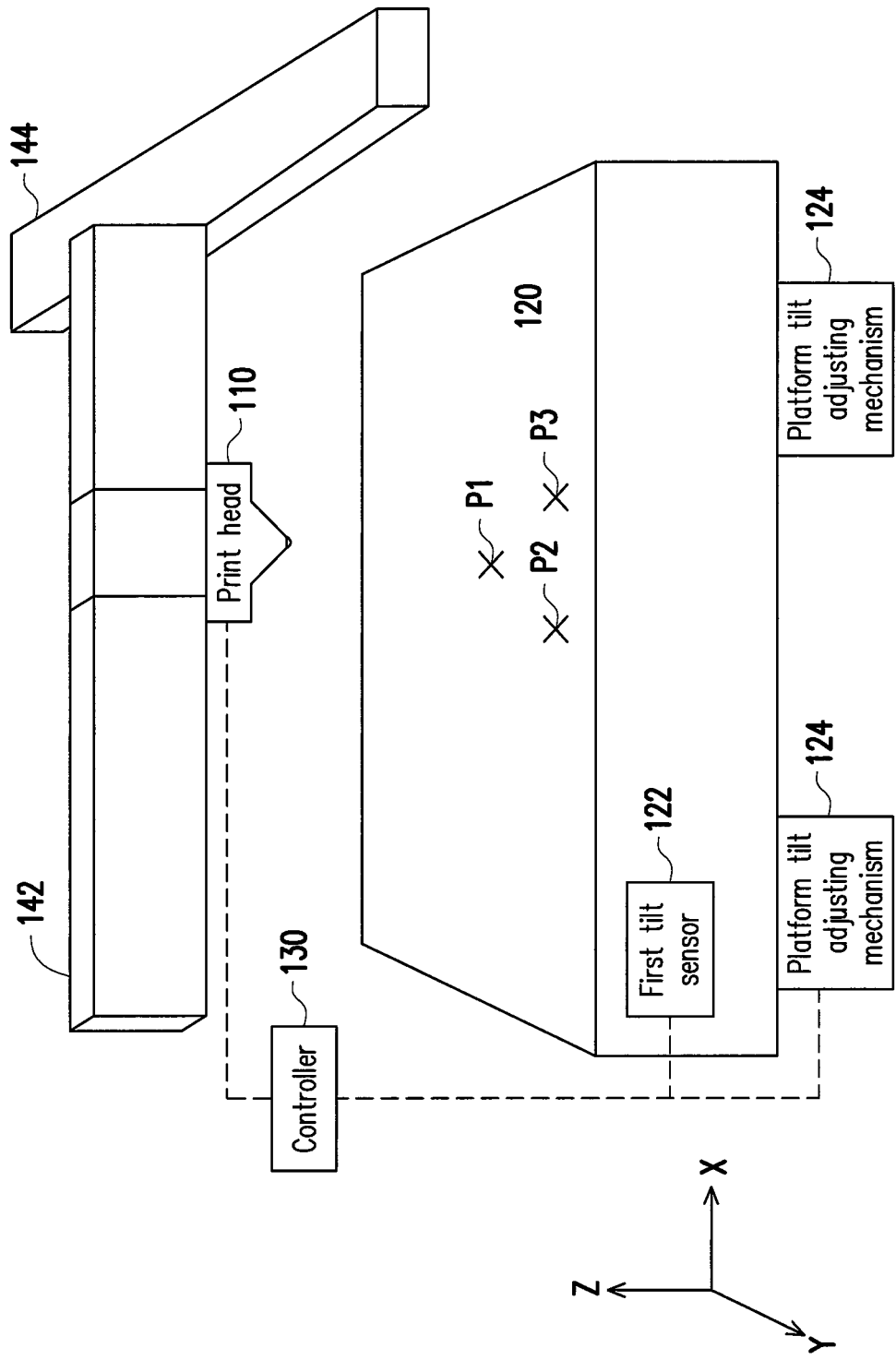
FIG. 3 shows a schematic diagram of a 3D printing device according to a second exemplary embodiment of the present invention.
Figure 4:
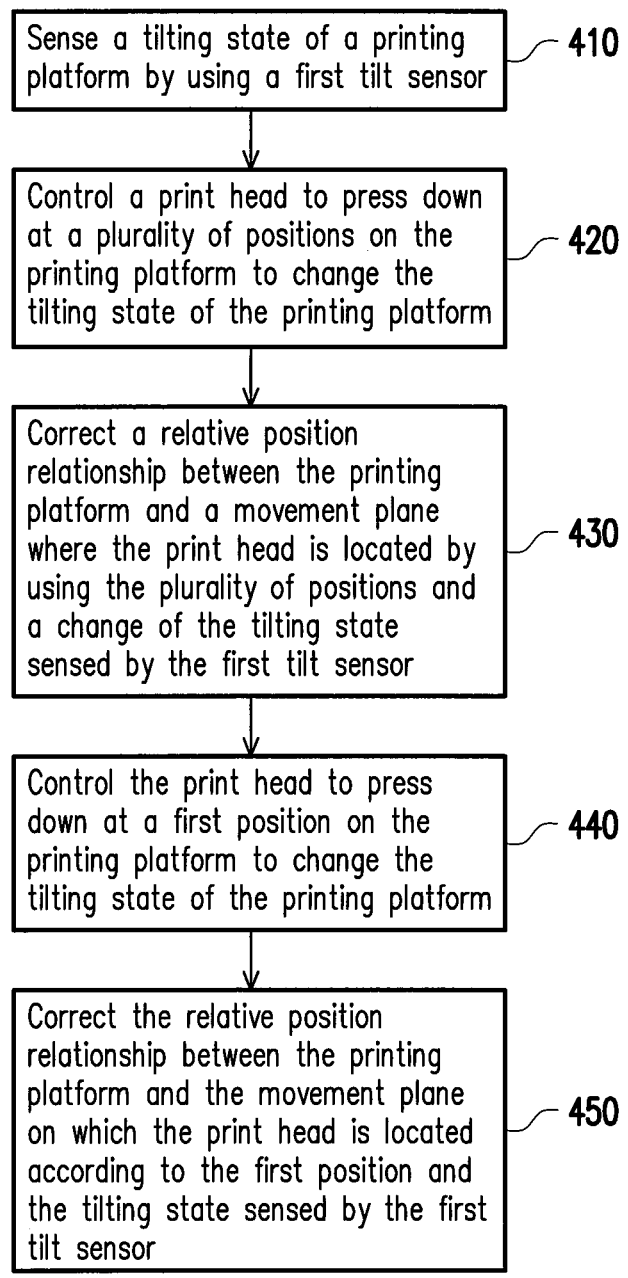
FIG. 4 shows a flowchart of a printing correction method according to the second exemplary embodiment of the present invention.

FIG. 3 shows a schematic diagram of a 3D printing device according to a second exemplary embodiment of the present invention. FIG. 4 shows a flowchart of a printing correction method according to the second exemplary embodiment of the present invention.

Referring to FIG. 3, in this exemplary embodiment, a 3D printing device includes a print head 110, a printing platform 120, and a controller 130. The print head 110 moves on a movement plane by means of a moving element 142 and a fastening element 144. The printing platform 120 includes a first tilt sensor 122 and a platform tilt adjusting mechanism 124. Because implementation manners of the print head 110, the printing platform 120, and the controller 130 are described in the first exemplary embodiment, the descriptions thereof are omitted herein.

The first exemplary embodiment differs from the second exemplary embodiment in that the second tilt sensor 146 is not disposed in this exemplary embodiment. That is, this exemplary embodiment only includes the first tilt sensor 122, and the controller 130 performs printing correction according to a tilt angle measured by the first tilt sensor 122 in a manner of pressing down the print head 110. A correction process of this exemplary embodiment is described by referring to FIG. 4.

Referring to FIG. 4, in a process of performing printing correction, similar to FIG. 3, the controller 130 first performs steps 410 to 430 to correct relative positions of the movement plane (namely, the xy plane) and the printing platform 120. Subsequently, steps 440 to 450 are performed to correct relative positions of the print head 110 and the printing platform 120 in the third axial direction (namely, the z axis).

in step 410, a controller 130 senses a tilting state of a printing platform 120 by using a first tilt sensor 122. Subsequently, in step 420m the controller 130 controls a print head 110 to press down at a plurality of positions on the printing platform 120 to change the tilting state of the printing platform 120. Moreover, in step 430, the controller 130 corrects a relative position relationship between the printing platform 120 and a movement plane on which the print head 110 is located according to the plurality of positions and the tilting state measured by the first tilt sensor 122.

Specifically, in step 420, the print head 110 presses down at a first position P1, a second position P2, and a third position P3 separately. When the print head 110 presses down and gets contact with the first position P1, because the first tilt sensor 122 detects that the tilting state of the printing platform 120 changes, the controller 130 determines that print head 110 presses down to the printing platform 120. At this time, the controller 130 obtains a displacement of the print head 110 in a third axial direction when the print head 110 presses down at the first position P1. Similarly, the controller 130 controls the print head 110 to press down at the second position P2 and third position P3, so as to respectively obtain displacements of the print head 110 in the third axial direction when the print head 110 presses down at the second position P2 and third position P3.

After the controller 130 obtains the displacements of the print head 110 in the third axial direction at the first position P1, second position P2, and third position P3, the controller 130 can calculate a relative tilting state between the movement plane and the printing platform 120 according to the displacements in the third axial direction at the first position P1, second position P2, and third position P3. Specifically, the controller 130 controls positions where the control print head 110 descends, that is, coordinate points of the first position P1, second position P2, and third position P3 in a first axial direction and a second axial direction are known. The controller 130 further obtains displacements in the third axial direction at the first position P1, second position P2, and third position P3 by pressing down the print head, so as to obtain third axial coordinates of the first position P1, second position P2, and third position P3 relative to the movement plane. Therefore, all coordinates of the first position P1, second position P2, and third position P3 are known. On the basis of the above, the controller 130 can calculate a relative tilting state between the movement plane and the printing platform 120 according to a mathematical manner such as a trigonometric function or a vector operation. Therefore, the controller 130 may further control the platform tilt adjusting mechanism 124 according to the calculated relative tilting state to adjust the printing platform 120, so as to make the printing platform 120 and the movement plane present a parallel state.

Steps 440 to 450 are used for correcting relative positions of the print head 110 and the printing platform 120 in the third axial direction. Implementation methods and processes of steps 440 to 450 are the same as those of steps 210 to 230 in FIG. 2, and the descriptions thereof are omitted herein.

In this exemplary embodiment, by means of disposing the first tilt sensor 122, the print head 110 no longer needs to be provided with a limit switch, so that the weight of the print head 110 is reduced, and a movement speed of the print head 110 is increased. Therefore, by means of the implementation manner of this exemplary embodiment, the time consumed for correcting the 3D printing device can also be effectively reduced.

In conclusion, in the present disclosure, by means of disposing a first tilt sensor on a printing platform, a print head may be provided with no limit switch, which reduces the weight of the print head, so that a movement speed of the print head is increased. In addition, by means of further disposing a second tilt sensor on a moving mechanism, a controller may directly adjust relative positions of a movement plane and the printing platform according to tilt values measured by the first tilt sensor and second tilt sensor.

Hence, it is only needed to control the print head to press down at one point on the printing platform, so as to correct relative positions of the movement plane and the printing platform in a first axial direction, a second axial direction, and a third axial direction. Therefore, by means of the 3D printing device of the present disclosure, the time consumed for correcting the 3D printing device can be effectively reduced.

Although embodiments of the present invention are disclosed as above, they are not intended to limit the present invention. Any person of ordinary skill in the art may make some variations or modifications without departing from the spirit and scope of the present invention. Therefore, the protection scope of the present invention shall be subject to the protection scope of the appended claims.

What is claimed is:

1. A three-dimensional (3D) printing device, comprising:
   a print head, controlled to move on a movement plane;
   a printing platform, comprising a first tilt sensor disposed on the printing platform, wherein the first tilt sensor is configured to sense a tilting state of the printing platform with respect to the movement plane; and
   a controller, coupled to the first tilt sensor,
   wherein the controller controls the print head to press down at and contact with a first position on a top surface of the printing platform that faces the movement plane so as to cause a change in the tilting state of the printing platform with a pressing force exerted on the printing platform by the print head, the change in the tilting state of the printing platform signals the controller that the print head has pressed down on the top surface of the printing platform so that the controller obtains a displacement of the print head in a z-axis direction at the first position and thereby calculates a coordinate of the first position in the z-axis direction relative to the movement plane, and the controller corrects a relative position relationship between the printing platform and the movement plane according to the obtained displacement.

2. The 3D printing device according to claim 1, further comprising:
   a moving mechanism, configured to move the print head on the movement plane,
   wherein the moving mechanism comprises a second tilt sensor, the second tilt sensor is coupled to the controller and configured to sense a tilting state of the movement plane,
   the controller further respectively obtains the respective tilting states of the printing platform and the movement plane by means of he first tilt sensor and the second tilt sensor to adjust and to correct the relative position relationship between the printing platform and the movement plane.

3. The 3D printing device according to claim 2, wherein the moving mechanism further comprises:
   a moving element, disposed along a first axis, wherein the print head is disposed on the moving element and moves along the first axis; and
   a fastening element, disposed along a second axis, wherein the fastening element actuates the moving element to move along the second axis, wherein:
   the first axis and the second axis are disposed not in parallel, and the first axis and the second axis constitute the movement plane.

4. The 3D printing device according to claim 3, wherein the second tilt sensor is disposed on the moving element.

5. The 3D printing device according to claim 2, further comprising:
   a platform tilt adjusting mechanism, configured to adjust the tilting state of the printing platform.

6. The 3D printing device according to claim 5, wherein the controller adjusts the tilting state of the printing platform by using the platform tilt adjusting mechanism to make tilt values obtained by the first tilt sensor and the second tilt sensor the same, so as to make the printing platform and the movement plane parallel.

7. The 3D printing device according to claim 1, wherein the controller further controls the print head to press down and contact with at a plurality of positions on the top surface of the printing platform to cause a change in the tilting state of the printing platform with pressing forces exerted on the printing platform by the print head, wherein the change in the tilting state of the printing platform signals the controller that the print head has pressed down on the top surface of the printing platform, and then the controller obtains displacements of the print head in the z-axis direction at the plurality of positions so as to obtain coordinates of the plurality of positions in the z-axis direction relative to the movement plane.

8. A method for correcting a print head and a printing platform, comprising:
   sensing a tilting state of the printing platform with respect to a movement plane on which the print head is located by using a first tilt sensor, wherein the first tilt sensor is disposed on the printing platform;
   controlling the print head to press down and contact with at a first position on a top surface of the printing platform that faces the movement plane so as to cause a change in the tilting state of the printing platform with a pressing force exerted on the printing platform by the print head, wherein the change in the titling state of the printing platform signals a controller that the print head has pressed down on the top surface of the printing platform, so that the controller obtains a displacement of the print head in a z-axis direction and thereby calculates a coordinate of the first position in the z-axis direction relative to the movement plane; and
   correcting a relative position relationship between the printing platform and the movement plane located according to the obtained displacement.

9. The method for correcting the print head and the printing platform according to claim 8, further comprising:
   sensing a tilting state of the movement plane by using a second tilt sensor, wherein the second tilt sensor is disposed on a moving mechanism configured to move the print head; and
   adjusting the tilting state of the printing platform by using a platform tilt adjusting mechanism to make tilt values obtained by the first tilt sensor and the second tilt sensor the same, so as to make the printing platform and the movement plane parallel.

10. The method for correcting the print head and the printing platform according to claim 8, further comprising:
    controlling the print head to press down at and contact with a plurality of positions on the top surface of the printing platform to cause a change in the tilting state of the printing platform with pressing forces exerted on the printing platform by the print head, wherein the change in the tilting state of the printing platform signals the controller that the print head has pressed down on the top surface of the printing platform, and then the controller obtains displacements of the print head in the z-axis direction at the plurality of position so as to obtain coordinates of the plurality of positions in the z-axis direction relative to the movement plane.

11. The 3D printing device according to claim 7, wherein the controller adjusts the tilting state of the printing platform by using the platform tilt adjusting mechanism to make the coordinates of the plurality of positions on the printing platform parallel to the movement plane in the z-axis direction so as to make the printing platform and the movement plane parallel.

12. The method for correcting the print head and the printing platform according to claim 10, further comprising:
    adjusting the tilting state of the printing platform by making the coordinates of the plurality of positions on the printing platform parallel to the movement plane in the z-axis direction so as to make the printing platform and the movement plane parallel.

\* \* \* \* \*